United States Patent
Beesabathina et al.

(10) Patent No.: US 6,409,813 B1
(45) Date of Patent: Jun. 25, 2002

(54) GLASS-RELEASE COATING, COATING PROCESS, AND COATED PARTS FOR MANUFACTURING GLASS

(76) Inventors: Durga P. Beesabathina, 901C Armfield Cir., Apt.#104, Norfolk, VA (US) 23505; Karl E. Wiedemann, 104 Rebecca Dr., Seaford, VA (US) 23696

( * ) Notice: Subject to any disclaimer, the term of this patent is extended or adjusted under 35 U.S.C. 154(b) by 0 days.

(21) Appl. No.: 09/434,392

(22) Filed: Nov. 4, 1999

Related U.S. Application Data

(60) Provisional application No. 60/134,754, filed on May 18, 1999.

(51) Int. Cl.$^7$ ................................................ B32B 7/36
(52) U.S. Cl. .................................. 106/38.22; 106/38.27
(58) Field of Search ............................ 106/38.22, 38.27

(56) References Cited

U.S. PATENT DOCUMENTS

| | | |
|---|---|---|
| 3,874,862 A | 4/1975 | Bickling, Jr. et al. |
| 3,885,062 A | 5/1975 | Bombola |
| 3,915,870 A | 10/1975 | Brown |
| 3,928,673 A | 12/1975 | Pardee et al. |
| 3,968,302 A | 7/1976 | Brown |
| 3,981,711 A | 9/1976 | Bjorkstrom |
| 3,988,137 A | 10/1976 | Goodwin |
| 3,994,707 A | 11/1976 | Newing, Jr. et al. |
| 3,994,847 A | 11/1976 | Marcantonio et al. |
| 4,039,337 A | 8/1977 | Brown et al. |
| 4,071,368 A | 1/1978 | Jones |
| 4,088,585 A | 5/1978 | Karpen |
| 4,097,257 A | 6/1978 | Davey |
| 4,110,095 A | 8/1978 | Stengle, Jr. |
| 4,131,552 A | 12/1978 | Marcantonio |
| 4,160,474 A | 7/1979 | Pryor et al. |
| 4,264,350 A | 4/1981 | Thomas |
| 4,382,998 A | 5/1983 | Stengle, Jr. et al. |
| 4,822,646 A | 4/1989 | Clark et al. |
| 4,904,626 A | 2/1990 | Shaffer |
| 4,954,177 A | 9/1990 | Schofield |
| 4,997,605 A | 3/1991 | Shaffer |
| 5,134,098 A | 7/1992 | Shaffer |
| 5,246,896 A | 9/1993 | Robertson et al. |
| 5,279,794 A | 1/1994 | Sasao |
| 5,336,454 A | 8/1994 | Montgomery |
| 5,466,310 A | 11/1995 | Ninham et al. |
| 5,585,136 A | 12/1996 | Barrow et al. |
| 5,597,396 A | 1/1997 | Tohjo |

OTHER PUBLICATIONS

Carborundum, "Combat Boron Nitride Coatings," Product literature, Jun. 1998.

*Primary Examiner*—David Brunsman
(74) *Attorney, Agent, or Firm*—Joy L. Bryant

(57) ABSTRACT

A thermally stable, glass-release coating comprising from about 25% to about 99.8% by weight of an oxide matrix and from about 75% to about 0.2% by weight of nitride particles, after curing, is used to coat parts that are used for glass manufacturing. The coating is applied to the part and cured at a temperature less than about 1200° C. The resulting parts are useful for glass manufacturing because the coating exhibits excellent glass-release properties and reduces and/or eliminates the need for swabbing agents.

29 Claims, 2 Drawing Sheets

GLASS-RELEASE COATING, COATING PROCESS, AND COATED PARTS FOR MANUFACTURING GLASS

CROSS-REFERENCE TO RELATED APPLICATIONS

This application claims the benefit of U.S. Provisional Application No. 60/134,754, entitled "Coated Parts for Manufacturing Glass," filed May 18, 1999, hereby incorporated by reference in its entirety.

FIELD OF THE INVENTION

The present invention relates to glass release coatings that are used in the manufacture of glass. In particular, it relates to glass release coatings comprising an oxide matrix and nitride particles after curing; parts that are used for manufacturing glass that are coated with the coating; and a method of applying the glass release coating to a part.

BACKGROUND OF THE INVENTION

During glass manufacturing, glass is poured, cut into lengths, transferred to and from processing sites, shaped into preliminary forms, blown, molded and cooled. During this process, various parts of the manufacturing machinery are exposed to the hot, molten glass. These parts are made of materials that may adhere to the glass; undergo thermal degradation; or wear unacceptably causing various problems in the glass manufacturing process. For example, parts that adhere to glass introduce flaws that may serve as stress risers and lead to the fracture of the glass. Innocuous flaws are often objectionable because the clarity of the glass makes these flaws easily visible. In turn, the glass product must be rejected and discarded.

One approach to facilitating the handling of glass during manufacturing, is to make the machinery parts from expensive materials such as platinum and zirconium alloys. Other techniques involve swabbing the machinery parts with a swabbing agent or applying lubricants to the surfaces of those parts which come into contact with the glass. Swabbing is a manual operation which produces loose residue that is easily transferred to the glass. In turn, it becomes necessary to discard the glass product from several of the first cycles after the swabbing operation.

Typical swabbing agents are oily liquids containing a graphite lubricant dispersed in a predominantly hydrocarbon carrier. The carrier is burned or evaporated off leaving a loose lubricant coating on the swabbed surface. In order to minimize the manual labor involved in applying the lubricant, several attempts have been made to try to automate the swabbing process.

Others have tried to simplify the swabbing process by substituting powdery mold release agents. In one instance, boron nitride particles were used in a mold dressing. However these mold dressing and powdery mold release agents lacked a necessary binder to hold the agent in place. In turn, loose lubricant particles were quickly lost and thus frequent re-application became necessary. Moreover, the loose lubricant particles introduced flaws into the glass product and were the cause for rejection of the glass product when the particles adhered to the glass or became incorporated into it.

An alternative approach was to use organic binders coupled with a lubricant. This approach failed to provide a lasting lubricated surface that contacted the glass, nor was the need for swabbing eliminated. In addition, these organic binders undergo thermal decomposition as a result of the molten glass coming into contact with the binder, limiting their life time.

In order to provide good thermal resistance, inorganic binders were coupled with lubricants. These binders typically contain silicates or phosphates of alkali, alkaline, or other metal oxides which have a tendency to react with the hot or molten glass.

Various structures including coatings have been fabricated from nitride powders including mixtures of nitride and oxide powders (U.S. Pat. No. 4,904,626, U.S. Pat. No. 4,997,605 and U.S. Pat. No. 5,134,098). In fabricating these structures, a binder is added to nitride powders or mixtures of nitride powders and oxide powders to provide green strength (in the unfired condition), to promote sintering during firing, and to act as a cement, gluing the particles together. This binder may be an oxide-forming compound and after firing may represent up to 15% of the structure by weight. However, these structures are not suitable for forming permanent, strong, durable, mold-release coatings on machinery parts because they must be fired at temperatures that are extreme (greater than 1200° C.) with respect to the parts. Such temperatures would melt, warp, or cause the parts to lose their tempering. In addition, once the coating is fully fired, the structures tend to be discontinuous having large pores which limits their strength, durability and glass-release ability.

Carborundum has a product line known as COMBAT Boron Nitride Coatings that function as mold release agents that employ an alumina binder. These coatings employ very coarse boron nitride particles (5–30 microns) which do not allow one to apply the coating at thicknesses less than about 25 micrometers. Typically, the coatings are applied at thicknesses of 75 micrometers to several centimeters thick. Once the coating is cured, it comprises 75% boron nitride and is soft and unable to resist mechanical wear. To have these types of coatings applied at these thicknesses to glass manufacturing parts would cause the machinery parts to bind and fail to operate. In addition, the application of these coatings requires careful processing involving many hours of drying and stages of firing to keep the coating from falling off of the part.

Therefore, it is an object of the present invention to provide coated parts for glass manufacturing having a coating that can withstand high temperatures, has excellent durability, and does not adhere to hot or molten glass.

Another object of the invention is to provide a part that is coated with a material having excellent bond strength and metal to metal lubricity.

Another object of the invention is to provide a coating that, when cured, provides a continuous oxide matrix that surrounds nitride particles.

Another object of the invention is to provide a coating comprising an oxide matrix and nitride particles that can be cured at temperatures less than about 1200° C. yet be able to withstand the high temperatures of molten glass.

Another object of the present invention is to provide a part coated with a material that is non-toxic and will not carry over or contaminate the glass.

Another object of the invention is to provide a part that has a coating that is applied off of the manufacturing line.

Another object of the invention is to provide a coating that requires minutes to a couple of hours to apply.

SUMMARY OF THE INVENTION

The aforementioned and other objects were achieved by the present invention which is a thermally stable, glass release coating comprising from about 25% to about 99.8% by weight of an oxide matrix and from about 75% to about 0.2% by weight of nitride particles after curing. The oxide matrix is prepared from a solution comprising from about 10% to about 90% by weight of a carrier liquid; from about 0.1% to about 30% by weight of a liquid stabilizer; from about 4.5% to about 40% by weight of an oxide forming compound; from about 0% to about 4% by weight of an oxide stabilizer; and from about 0% to about 2% by weight of a corrosion inhibitor. The thermally stable, glass-release coating is applied to a part such that the part is coated with the coating and cured at a temperature less than about 1200° C. The resulting part is useful for glass manufacturing because the coating exhibits excellent glass-release properties and reduces and/or eliminates the need for swabbing agents.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
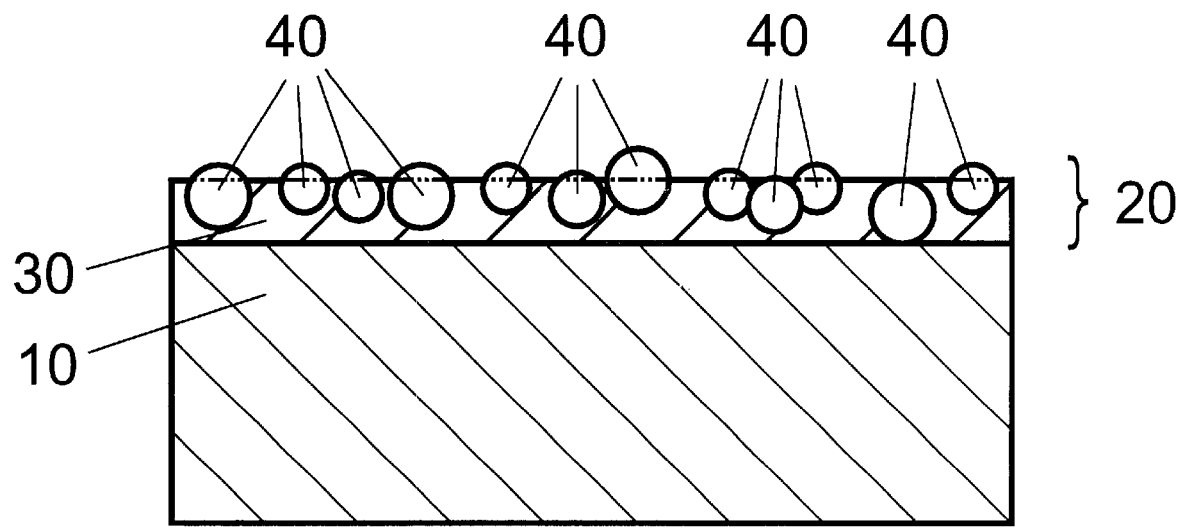
FIG. 1 depicts a coated part having exposed nitride particles.

The thermally stable, glass-release coating of the present invention comprises from about 25% to about 99.8% by weight of an oxide matrix and from about 75% to about 0.2% by weight of nitride particles after the coating has been cured. The cured coating is inert or non-reactive with molten glass. Preferably, after curing, the coating comprises from about 65% to about 95% by weight of the oxide matrix and from about 5% to about 35% by weight of nitride particles. In a most preferred embodiment of the invention, after curing, the coating comprises from about 35% to about 60% by weight of the oxide matrix and from about 40% to about 65% by weight of nitride particles.

The oxide matrix is prepared from a solution comprising from about 10% to about 90% by weight of a carrier liquid; from about 0.1% to about 30% by weight of a liquid stabilizer; from about 4.5% to about 40% by weight of an oxide forming compound; from about 0% to about 4% by weight of an oxide stabilizer; and from about 0% to about 2% by weight of a corrosion inhibitor. In one embodiment, the oxide matrix is prepared from a solution comprising from about 55% to 95% by weight of a carrier liquid; about 0.1% to about 3% by weight of a liquid stabilizer; and about 4.5% to about 40% by weight of an oxide-forming compound. In an alternative embodiment, the oxide matrix is prepared from a solution comprising from about 40% to about 90% by weight of a carrier liquid; about 2.5% to about 30% by weight of a liquid stabilizer; and about 10% to about 40% by weight of an oxide-forming compound.

A carrier liquid is used to help disperse a nitride compound and to mix with an oxide-forming compound. It may also serve as a diluent and/or a solvent. The carrier liquid contributes to the viscosity of the coating before it is applied and depending on how the coating is applied, it may influence the final application thickness. Examples of the carrier liquid include but are not limited to: water, alcohols, ketones, ethers, and polar solvents or various combinations thereof. Alcohols, particularly methanol, act as solvents while ketones, such as methyl-ethyl ketone (MEK), act as diluents that help form thin, uniform applied layers. Water plays a more complex role and in large amounts, it acts as a solvent for the oxide-forming compound. In smaller amounts, the water may be consumed by reactions with the oxide-forming compound. It is desirable to have the carrier liquid function to control the viscosity and application thickness of the coating when it is applied using standard dipping techniques. Preferably, the carrier liquid comprises water, alcohols, ketones; and possibly a surfactant, such as octoxynol (TX-100, commercially available from Rohm & Haas) to provide a carrier liquid that is sufficiently polar in cooperation with the stabilizer so as to stabilize the oxide-forming compound in liquid form. Most preferably, the carrier liquid comprises water. In one embodiment of the invention, the carrier liquid comprises from about 0% to about 50% by weight of alcohol; from about 0% to about 40% by weight of ketone; from about 1% to about 80% by weight of water; and from about 0% to about 1% by weight of a surfactant. More specifically, the carrier liquid comprises about 37% by weight of isopropyl alcohol; about 27% by weight of methyl ethyl ketone; about 1.9% by weight of water; and about 0.1% by weight of octoxynol surfactant. Alternatively, from about 0% to about 2% by weight of a corrosion inhibitor may be added to the formulation. Any corrosion inhibitor known to those skilled in the art may be used and in particular, tannic acid was found to be effective at a range from about 750 ppm to about 0.5% by weight.

Any oxide-forming compound known to those skilled in the art may be added to the carrier liquid. In particular, the oxide-forming compound is selected from the group consisting of: a zirconium compound; a chromium compound; and an aluminum compound. In one embodiment of the invention, the oxide-forming compound is a zirconium compound selected from the group consisting of: a salt of zirconium; an oxy-salt of zirconium; and an alkoxide of zirconium or various combinations thereof. Preferably, the zirconium compound is an alkoxide of zirconium such as zirconium n-propoxide and may be present at a range from about 10% to about 40% by weight. In an alternate embodiment of the invention, the oxide matrix is prepared from about 4.5% to about 40% by weight of an aluminum compound selected from the group consisting of: aluminum sec-butoxide; aluminum iso-propoxide; aluminum 2,4-pentanedionate; and aluminum di-sec-butoxide ethyl acetoacetic ester chelate. Most preferably, the oxide matrix is prepared from about 4.5% to about 40% by weight of aluminum iso-propoxide.

A liquid stabilizer is typically added at about 0.1% by weight to about 30% by weight and is capable of stabilizing the oxide-forming compound in a liquid form. By stabilizing it is meant that the oxide-forming compound is modified or protected from reactions that would cause it to form a precipitate. For example, the liquid stabilizer may be a compound capable of reducing the pH such as an acid. Examples of such acids include but are not limited to: nitric acid; acetic acid; and hydrochloric acid. In one embodiment, the liquid stabilizer comprises from about 0.1% to about 3% by weight of acetic acid. In another embodiment, the liquid stabilizer comprises from about 2.5% to about 15% by weight of nitric acid. Alternatively, a chelating agent may be used to form a soluble complex. Examples of various chelating agents include but are not limited to: 2,4-pentanedione and ethyl acetoacetate. The stabilizer helps to hold the oxide-forming compound in a liquid form for a sufficient time for the liquid coating to be prepared and applied to the substrate. Thus the oxide-forming compound must remain in liquid form for at least 30 minutes. Preferably, the oxide-forming compound remains in liquid form for at least several weeks. However, the length of time is often dependent on the amount of stabilizer added. For example, when the carrier liquid is sufficiently polar and the molar ratio of nitric acid to zirconium is at least 1.5 to 1, the zirconium compound will remain in liquid form indefinitely provided that the mixture is not heated above 60° C., is not heavily diluted, and does not contain precipitating agents such as phosphates.

In an alternative embodiment, about 0% to about 4% by weight of an oxide-stabilizer can be added to the formulation. The oxide-stabilizer will stabilize a particular crystalline form of the oxide of an oxide-forming compound. This helps to avoid mechanically disruptive phase changes. The oxide-stabilizer must be in liquid form to maintain intimate mixture with the oxide-forming compound while the oxide-forming compound forms the oxide matrix that conforms to the shape of the substrate and surrounds the nitride particles. The oxide-stabilizer must work with the carrier liquid and the liquid-stabilizer to keep the oxide-forming compound in a liquid form. For example, if the liquid stabilizer is nitric acid, the oxide-stabilizer should preferably be in the nitrate form, however other forms will work also. Examples of preferred oxide-stabilizers include: yttrium nitrate, magnesium nitrate, calcium nitrate, and cerium nitrate and various combinations thereof. Most preferably, the oxide stabilizer is yttrium nitrate which is present at about 0.6% to about 3.0% by weight. The choice of a nitrate promotes compatibility between the nitrate ions of the oxide-stabilizer and the nitrate ions in the liquid stabilizer. After the coating containing the oxide-stabilizing agent is cured, the cations of the oxide-stabilizing agent convert to an oxide.

The source of nitride particles may be any nitrides known to those skilled in the art and in particular are those selected from the group consisting of: boron nitride; chromium nitride; tantalum nitride; titanium nitride; zirconium nitride; and aluminum nitride. Preferably the nitride is boron nitride and, most preferably, boron nitride in the powder form of the hexagonal polymorph of boron nitride. In one embodiment, boron nitride is present in the liquid coating at about 0.3% to about 3% by weight. In a second embodiment, the boron nitride is present in the liquid coating at about 0.3% to about 1% by weight. Most preferably, the boron nitride is present in the liquid coating at about 1.8% to about 2.5% by weight. The diameters of the particles are preferably less than about 5 microns and most preferably less than about 1 micron. These dimensions and the hexagonal form are preferred because of the nitride's thermal stability coupled with its softness and lubricating characteristics. Since, in the cured coating, the nitride particles are bound by the oxide matrix, the lubricating action of the softer hexagonal polymorph of the boron nitride particles is retained by the wear-resistant action of the harder oxide matrix.

The thermally stable, glass-release coating described above is applied to various parts used in the manufacture of glass. Preferably, the part may be shears; troughs; mandrels; parison molds; blank molds; blow molds; neck rings; guide rings; guide plates; plungers; pins; machine orifices; machine inserts or various combinations thereof. The part is coated with the thermally stable, glass-release coating and the coating is cured at a temperature less than about 1200° C.

When applied, the thermally stable, glass-release coating is in liquid form. To use a liquid form of the coating for this type of process is unusual. Typical prior art methods for coatings used at high temperatures require that the initial coating material be either a solid that is evaporated and condensed on the part or a gas that is simultaneously deposited and chemically converted on the part. For prior art methods where the coating is applied using thermal spray techniques, the initial coating is a powder that is partially melted on to the part by the thermal and kinetic energy of the spray. Other prior art methods that employ brazing applications require a powder of hot-pressed ceramic having the shape of the part that is made to adhere to the part with a brazing alloy, resulting in a thick coating. Since the thermally stable, glass-release coating is in the liquid form, it can be easily applied using such techniques as flow coating; dipping; spraying; brushing; and rolling or various combinations thereof. Preferably, the coating is applied to the part by dipping. Once the liquid coating has been applied to the part, it is cured. Typical curing methods include but are not limited to ambient curing; chemical curing; and heat curing. Preferably the coating is heat cured by heating it to temperatures less than about 1200° C. More specifically, the coating may be cured at a temperature less than about 600° C. or in a temperature range from about 500° C. to about 600° C., with a most preferred temperature of about 550° C. Curing at 350° C. leads to thermal decomposition of the portions of the liquid that were not removed by evaporation. Thermal decomposition is accompanied by densification and shrinkage of the layer being cured. When the coating is cured at about 500° C., it needs to be exposed to this temperature for more than 5 minutes, whereas the preferred curing cycle is at about 550° C. for about 10 minutes.

Referring now to FIG. 1, it is desirable to have a thin layer (less than about 25 micrometers) of the coating 20 applied to the part 10 such that the nitride particles 40 will be exposed on the surface of the coating 20 with the oxide matrix 30 remaining close to the part 10. This will permit the exposed nitride particles 40 to have a lubricating action with respect to the glass. Subsequent layers of the liquid coating may be applied on top of the cured coating by repeating the steps of applying the coating and curing it. However, care must be taken not to apply any layer too thick (greater than about 25 micrometers). If a layer is applied too thick, the shrinkage that it undergoes on curing may cause the cured layer to crack. This cracking is unacceptable and thus the thickness of the applied layer must be reduced. In addition, the overall thickness of the coating should not be too great as it may cause the coated part to bind during operation and is more likely to crack because the thermal expansion of the coating is unequal to the thermal expansion of the part. However, a thin coating can sustain the strain of such unequal expansion without cracking. The coating may be thinned by diluting the concentration of the initial coating composition. If the coating is applied by dipping, improving the drainage of the substrate will help in keeping the thickness controlled. For spray coating, applying a lighter coat will give a thinner coating. Other application techniques may be similarly modified using techniques known to those skilled in the art to provide optimal results wherein the thickness of the coating is approximately equal to or less than the average diameter of the nitride particles (less than about 25 micrometers).

Figure 2:
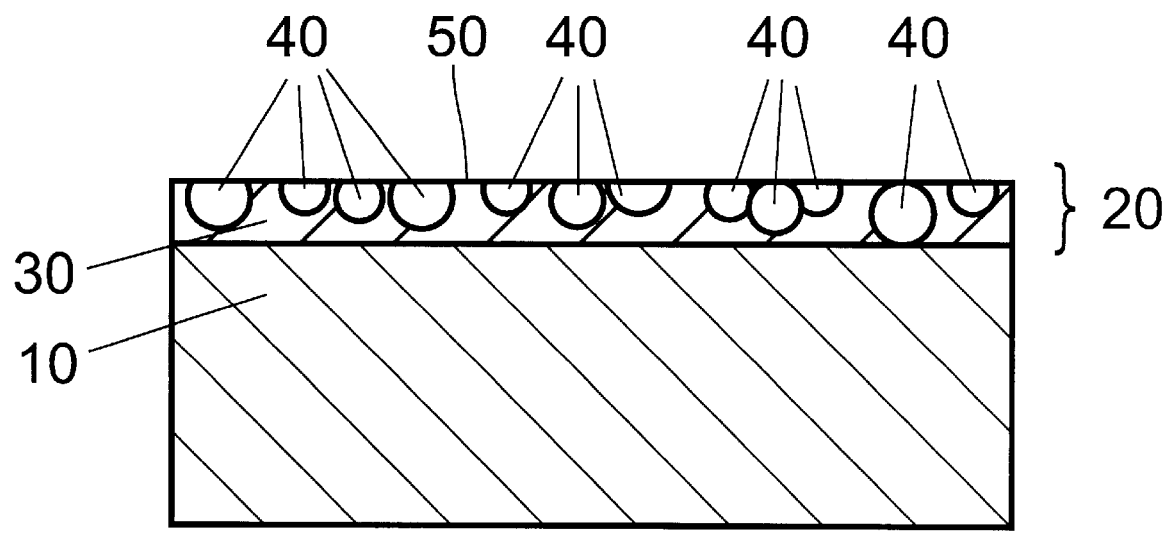
FIG. 2 depicts a coated part having exposed nitride particles that have been sheared off as a result of use.

FIG. 2 shows the effect of prolonged use of the part 10 having the thermally stable, glass-release coating 20 disposed on it. The coating 20 exhibits excellent glass-release properties because of the exposed nitride particles 40. The oxide matrix 30 works with the nitride particles 40 to form a coating 20 that protects the part 10 from direct contact with the glass and prevents the glass from adhering to the part. The oxide matrix 30 is inert or resists chemically reacting with the glass. Moreover, the coating 20 stands up to mechanical wear caused by movement of the glass over the working surface 50. The nitride particles 40 that are exposed on the surface exhibit some wear with time and exposure to the hot, molten glass. However, the hardness of the oxide matrix 30 prevents the particles from being completely worn away. In the most preferred embodiment, which employs hexagonal boron nitride particles in a stabilized zirconium oxide, the lubricating action of the softer, nitride particles 40 is retained by the wear-resistant action of the oxide matrix 30.

Figure 3:
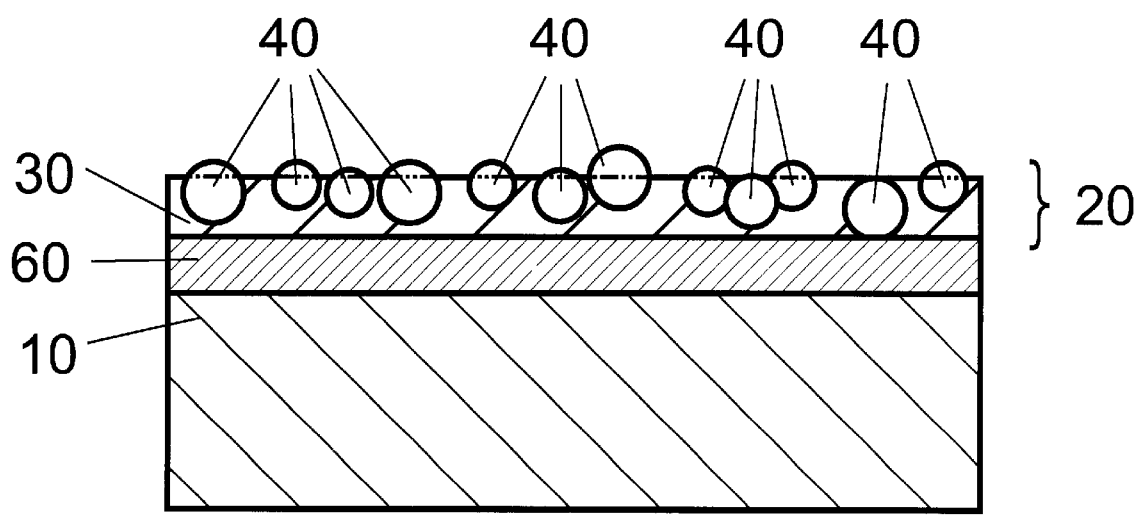
FIG. 3 depicts an alternative embodiment of the invention wherein the coated part has a corrosion resistant primer coating disposed between the part and the thermally stable, glass-release coating.

FIG. 3 shows an alternative embodiment, where a corrosion resistant primer coating 60 is disposed between the part 10 and the thermally stable, glass-release coating 20. The corrosion resistant primer coating comprises a corrosion resistant material such as nickel alloy and more specifically is an electroless nickel alloy. The corrosion resistant primer coating is used to facilitate the processing. The corrosion resistant primer is typically applied by immersing the part in an electroless nickel bath prior to the application of the coating.

EXAMPLES

Example 1

A liquid version of the coating was prepared by adding in a flask 32.9 grams of nitric acid to 45.1 grams isopropyl alcohol slowly and with stirring to prevent violent boiling. The isopropyl alcohol is a carrier liquid and solvent, the nitric acid is a liquid-stabilizing agent for stabilizing the zirconium compound in liquid form. To this mixture was added, 64.7 grams of zirconium n-propoxide and mixed followed by 4.9 grams of yttrium nitrate which was dissolved. The zirconium n-propoxide was the source of zirconium and yttrium nitrate was the source of yttrium, which is an oxide-stabilizing agent. The zirconium n-propoxide is sold commercially as a 70% solution in n-propanol (available from Alfa Aesar). It is to be understood that the weight specified for the zirconium n-propoxide means the weight of the 70% solution. After the complete mixing, 5.8 grams of deionized water was added and mixed. The mixture was allowed to stand for 30 minutes. The water reacted with the zirconium n-propoxide to form in the presence of the nitric acid a liquid zirconium compound.

In a second flask, 0.75 grams of tannic acid (commercially available from Alfa Aesar) were added to 30 grams isopropyl alcohol and 4.5 grams of water. The tannic acid serves as a corrosion-inhibiting agent and the water and isopropyl alcohol are solvents. The contents of the second flask were added to the first, mixed and allowed to stand for 30 minutes. The water from the second flask, which serves as a solvent, reacted to completely consume the remaining zirconium n-propoxide and the excess water continued to act as a solvent.

In a third flask, 0.27 grams of octoxynol (commercially available from Rohm&Haas as TRITON X-100) were added to 67.75 grams methyl ethyl ketone and isopropyl alcohol. The octoxynol is a non-ionic surfactant, the methyl ethyl ketone is a carrier liquid, and the isopropyl alcohol is a solvent. The contents of the flask were added to the first flask, mixed and allowed to stand for 30 minutes.

In a fourth flask, 0.17 grams of tannic acid were added to 10.21 grams of isopropyl alcohol and 0.75 grams of water. The tannic acid is a corrosion inhibiting agent and the water and isopropyl alcohol are solvents. The contents of the fourth flask were added to the first, mixed and allowed to stand for 15 minutes. The water remained as a solvent because all of the zirconium n-propoxide had been previously consumed.

In a fifth flask, 1.8 grams of boron nitride powder having a particle size of approximately 1 micron (commercially available from Aldrich Chemical Company) was added to 15.26 grams of methyl ethyl ketone and 10.34 grams of isopropyl alcohol. The boron nitride powder did not dissolve but formed a suspension on stirring. The boron nitride powder serves as the source of boron nitride particles, the methyl ethyl ketone is a carrier liquid and the isopropyl alcohol is a solvent. The mixture was stirred to suspend all of the boron nitride powder and added to the first flask. The resulting mixture in the first flask was a liquid coating that formed a boron nitride dispersion in a stabilized zirconium oxide matrix when applied to a surface, dried, and cured at 550° C. for 10 minutes.

Example 2

Neck rings and guide plates used to form the neck, threads and sealing lip of glass bottles were coated to promote good glass-release. The neck rings are prepared from a silicon-brass alloy and the guide plates comprise an iron alloy. The neck rings and guide plates work together as an assembly to form the neck, threads and sealing lip of a glass bottle. The assembly receives a charge of molten glass and holds the glass while it is initially formed in a parisan mold; then it is used to carry the glass to the blow mold where the glass is blown into the final shape of the glass bottle. It is imperative that assembly be compatible with the molten glass, be able to hold the glass as it is formed into a bottle, and be able to accurately form the neck, threads and sealing lip of the bottle. When the forming operations are completed, the assembly must be able to open and cleanly release the bottle.

The neck rings and guide plates were prepared by immersing the uncoated parts in alkaline baths to remove machining oils, acid cleaning to remove light oxide scale, and rinsing in a detergent rinse to produce water-break-free surfaces. Water break is observed by immersing a part in deionized water and, after removing the part, looking for areas that do not remain wet.

A corrosion resistant primer coat comprising nickel was applied by an electroless nickel bath. A commercial electroless nickel bath Enplate NI-429 Special (available from Enthone-OMI, Inc.) was used according to the manufacturer's instructions. The immersion time was 5 minutes at a bath temperature of 75° C. and a pH of 6.2. Because, for the silicon brass alloy, the initiation of the electroless nickel deposit was not always spontaneous, a 30-second, 5-volt cathodic charge was applied to the parts to form an initial nickel strike. After 5 minutes in the bath, the parts were removed and rinsed with deionized water.

The liquid coating of Example 1 was applied by dipping the part into the coating. The coating was allowed to dry for 10 minutes at 75° C. and cure for 10 minutes at 550° C. After cooling to room temperature, the parts were dipped a second time, dried for 10 minutes at 75° C. and cured for 10 minutes at 550° C. The resulting parts had a primer coating of corrosion resistant material, an electroless nickel alloy, and an outer coating of two layers of a boron-nitride dispersion in a stabilized zirconium oxide matrix wherein the boron-nitride particles were exposed on the surface.

Example 3

A liquid coating was prepared by mixing in a flask 1.2 grams of acetic acid in 24 grams of isopropyl alcohol. The acetic acid is a liquid-stabilizing agent and the isopropyl alcohol is a solvent. To this mixture was added 51 grams of aluminum sec-butoxide. The aluminum sec-butoxide serves as the source of aluminum. The contents of the flask were allowed to stand for 1 hour.

In a second flask, 200 grams of deionized water were heated to 90° C. The water serves as a carrier liquid. While stirring, the contents of the first flask were added to the second flask to produce a turbid mixture. The solution was maintained at 90 to 100° C. for two weeks with refluxing and the occasional addition of deionized water to keep the volume of the solution constant. At the conclusion of the two weeks, the solution had significantly cleared and 6 grams of boron nitride powder having a particle size of approximately 1 micron (commercially available from Aldrich Chemical Company) was added. The resulting mixture was a liquid coating that formed a boron nitride dispersion in an aluminum oxide matrix coating when applied to the surface, dried, and cured at 550° C. for 10 minutes.

Example 4

Shear blades are used to cut molten glass into gobs. The blades are made of an iron alloy and work in pairs to cut a falling stream of glass by sliding across each other and slicing through the glass stream along sharpened edges.

The liquid coating prepared in Example 3 was applied to the shear blades. The uncoated blades were dipped into the liquid coating, dried for 10 minutes at 75 ° C. and cured at 550° C. for 10 minutes. After cooling, the parts were dipped a second time into the liquid coating, dried for 10 minutes and cured at 550° C. for 10 minutes. The resulting parts had a coating of two layers of a boron-nitride dispersion in an aluminum oxide matrix wherein the boron-nitride particles were exposed on the surface.

In trials, the coated shear blades eliminated defects associated with glass adhesion, lasted 35% longer than the uncoated shear blades, and retained their sharpness better than the uncoated blades.

Example 5

Following a similar regimen as in Example 1, thermally stable glass-release coatings were prepared having the following formulations and properties:

| Formulation Number | 1 | | 2 | | 3 | |
|---|---|---|---|---|---|---|
| Form | Liquid | Cured | Liquid | Cured | Liquid | Cured |
| Carrier Liquid | 67% | | 79% | | 67% | |
| Liquid Stabilizer | 10.6% | | 0.29%* | | 7.1% | |
| Oxide Former | 21% | | 18.2% | | 21% | |
| Oxide | 1.56% | 3.6% | 0% | 0% | 1.38% | 2.4% |
| Stabilizer | | | | | | |
| Corrosion Inhibitor | 0.3% | | 0% | | 765 ppm | |
| Nitride Powder | 0.58% | 9.2% | 2.1% | 54% | 2.6% | 31% |
| Oxide (incl. stabilizer) | | 91% | | 46% | | 69% |

*For aluminum sec-butoxide only

Each of the resulting cured coatings formed a continuous oxide matrix surrounding the dispersed nitride particles.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A thermally stable, glass-release coating comprising from about 65% to about 95% by weight of an oxide matrix and from about 5% to about 35% by weight of nitride particles after curing; and wherein the oxide matrix is prepared from a solution comprising from about 10% to about 90% by weight of a carrier liquid; from about 0.1% to about 30% by weight of a liquid stabilizer; from about 4.5% to about 40% by weight of an oxide-forming compound; from about 0% to about 4% by weight of an oxide stabilizer; and from about 0% to about 2% by weight of a corrosion inhibitor.

2. A thermally stable, glass-release coating according to claim 1, wherein the oxide matrix is prepared from a solution comprising from about 55% to 95% by weight of a carrier liquid; about 0.1% to about 3% by weight of a liquid stabilizer; and about 4.5% to about 40% by weight of an oxide-forming compound.

3. A thermally stable, glass-release coating according to claim 1, wherein the oxide matrix is prepared from a solution comprising from about 40% to about 90% by weight of a carrier liquid; about 2.5% to about 30% by weight of a liquid stabilizer; and about 10% to about 40% by weight of an oxide-forming compound.

4. A thermally stable, glass-release coating according to claim 1, wherein the carrier liquid is selected from the group consisting of: water; an alcohol; and a ketone.

5. A thermally stable, glass-release coating according to claim 4, wherein the carrier liquid further comprises a surfactant.

6. A thermally stable, glass-release coating according to claim 4, wherein the carrier liquid comprises from about 0% by weight to about 50% by weight of an alcohol; from about 0% by weight to about 40% by weight of a ketone; from about 1% to about 80% by weight of water; and from about 0% to about 1% by weight of a surfactant.

7. A thermally stable, glass-release coating according to claim 6, wherein the carrier liquid comprises about 37% by weight of isopropyl alcohol; about 27% by weight of methyl ethyl ketone; about 1.9% by weight of water; and about 0.1% by weight of octoxynol surfactant.

8. A thermally stable, glass-release coating according to claim 4, wherein the carrier liquid comprises water.

9. A thermally stable, glass-release coating according to claim 4, wherein the corrosion inhibitor comprises from about 750 ppm to about 0.5% by weight of tannic acid.

10. A thermally stable, glass-release coating according to claim 1, wherein the liquid stabilizer is a compound capable of reducing pH.

11. A thermally stable, glass-release coating according to claim 10, wherein the liquid stabilizer comprises from about 0.1% to about 3% by weight of acetic acid.

12. A thermally stable, glass-release coating according to claim 10, wherein the liquid stabilizer comprises from about 2.5% to about 15% by weight of nitric acid.

13. A thermally stable, glass-release coating according to claim 1, wherein the oxide-forming compound is selected from the group consisting of: a zirconium compound; a chromium compound; and an aluminum compound.

14. A thermally stable, glass-release coating according to claim 13, wherein the zirconium compound is selected from the group consisting a salt of zirconium; an oxy-salt of zirconium; and an alkoxide of zirconium.

15. A thermally stable, glass-release coating according to claim 14, wherein the zirconium compound is an alkoxide of zirconium.

16. A thermally stable, glass-release coating according to claim 15, wherein the zirconium compound is zirconium n-propoxide.

17. A thermally stable, glass-release coating according to claim 16, wherein the oxide matrix is prepared from about 10% to about 40% by weight of zirconium n-propoxide.

18. A thermally stable, glass-release coating according to claim 15, wherein the oxide matrix is prepared from about 4.5% to about 40% by weight of an aluminum compound selected from the group consisting of: aluminum sec-butoxide; aluminum iso-propoxide; aluminum 2,4-pentanedionate; and aluminum di-sec-butoxide ethyl acetoacetic ester chelate.

19. A thermally stable, glass-release coating according to claim 18, wherein the oxide matrix is prepared from about 4.5% to about 40% by weight of aluminum iso-propoxide.

20. A thermally stable, glass-release coating according to claim 1, wherein the oxide stabilizer is selected from the group consisting of: yttrium nitrate, magnesium nitrate, calcium nitrate, and cerium nitrate.

21. A thermally stable, glass-release coating according to claim 20, wherein the oxide stabilizer is yttrium nitrate.

22. A thermally stable, glass-release coating according to claim 21, wherein the yttrium nitrate is present at about 0.6% to about 3.0% by weight.

23. A thermally stable, glass-release coating according to claim 1, wherein the nitride particles have a diameter less than about 5 microns.

24. A thermally stable, glass-release coating according to claim 23, wherein the nitride particles comprise nitrides selected from the group consisting of: boron nitride; chromium nitride; aluminum nitride; tantalum nitride; titanium nitride; and zirconium nitride.

25. A thermally stable, glass-release coating according to claim 24, wherein the nitride is boron nitride.

26. A thermally stable, glass-release coating according to claim 1, wherein the solution further comprises about 0.3% to about 3% by weight boron nitride.

27. A thermally stable, glass-release coating according to claim 1, wherein the solution further comprises about 0.3% to about 1% by weight boron nitride.

28. A thermally stable, glass-release coating according to claim 1, wherein the solution further comprises about 1.8% to about 2.5% by weight boron nitride.

29. A thermally stable, glass-release coating according to claim 1, wherein the carrier liquid is a polar solvent.

* * * * *